United States Patent [19]
Kondo

[11] Patent Number: 6,099,425
[45] Date of Patent: Aug. 8, 2000

[54] FRONT DERAILLEUR FOR A BICYCLE

[75] Inventor: Masanori Kondo, Nagagun, Japan

[73] Assignee: Shimano, Inc., Osaka, Japan

[21] Appl. No.: 09/280,084

[22] Filed: Mar. 29, 1999

[51] Int. Cl.$^7$ .............................. F16H 61/00; F16H 7/22
[52] U.S. Cl. ............................................. 474/82; 474/127
[58] Field of Search .................................. 474/69, 70, 78, 474/79, 80, 82, 119, 122, 127; 280/261

[56] References Cited

U.S. PATENT DOCUMENTS

| | | | |
|---|---|---|---|
| 5,620,384 | 4/1997 | Kojima et al. | 474/82 |
| 5,779,581 | 7/1998 | Fujii | 474/82 |

FOREIGN PATENT DOCUMENTS 19703933   6/1998   Germany .

*Primary Examiner*—Thomas R. Hannon
*Assistant Examiner*—Matthew A. Kaness
*Attorney, Agent, or Firm*—Shinjyu Global IP Counselors, LLP

[57] ABSTRACT

A front derailleur for a bicycle is provided to move or shift a chain between two or more sprockets for changing gears. The front derailleur can be connected to the shift cable such that the shift cable is pulled upwardly or downwardly relative to the bicycle frame. The front derailleur has a fixed member adapted to be coupled to a portion of the bicycle, a chain guide for shifting the chain of the bicycle and a linkage assembly coupled between the fixed member and the chain guide. The chain guide is located above the fixed member and a coil spring is used to bias the chain guide from an extended position to a retracted position. A detachable guide member is removably coupled to the linkage assembly for guiding the shift cable downwardly and then upwardly relative to the bicycle frame for use with an upwardly pulled shift cable. If the detachable guide member is removed, then the shift cable is only pulled downwardly relative to the bicycle frame for use with a downwardly pulled shift cable.

20 Claims, 6 Drawing Sheets

FRONT DERAILLEUR FOR A BICYCLE

BACKGROUND OF THE INVENTION

1. Field of the Invention

This invention generally relates to a front derailleur for a bicycle. More specifically, the present invention relates a front derailleur for a bicycle that can be used with many different shapes of bicycle frames.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One part of the bicycle that has been extensively redesigned is the frame of the bicycle. In fact, each bicycle manufacturer may have several different frame designs. Accordingly, most bicycle components can not work on all bicycle frames. This requires the bicycle component manufacturers to produce a different bicycle component for different frame designs. For example, most bicycle frames have cable guides (cable housing stoppers) that are welded on the frame tubes at various locations for guiding brake cables and shift cables to their respective components. Depending upon the placement of these cable guides, the configuration of the brake or derailleur may need to be changed.

This problem is particularly present in manufacturing a front derailleur that is mounted onto the bicycle frame adjacent to the front sprockets. Generally, a front derailleur includes a fixed member nonmovably secured to a bicycle frame, and a movable section supported to be movable relative to the fixed member. Typically, the fixed member is a tubular clamping member that is secured to the seat tube. Alternatively, the fixed member is sometimes coupled to the bottom bracket. The movable section has a chain guide with a pair of cage plates for contacting and moving a chain between the front sprockets.

The movable section is movable relative to the fixed member by pulling a shift control cable. In particular, the movable section and fixed member usually are interconnected through pivotal links. The control cable is connected to one of the pivotal links to apply a torque thereto, thereby causing the links to move the movable section. The control cable is fixedly coupled to the link in such a position that an operating force is applied to the control cable. This force on the cable is converted into a link swinging torque. Depending on the arrangement and locations of the cable guides, the cable attachment member of the front derailleur may needed to be configured differently for different types of frames.

In particular, some manufacturers have the front shift cable directed to the top of the front derailleur, while other manufacturers have the front shift cable directed to the bottom of the front derailleur. If the front shift cable is directed to the top of the front derailleur, then cable guides are welded along the top tube and the seat tube. If the front shift cable is directed to the bottom of the front derailleur, then cable guides are welded along the down tube.

This presents a problem for many bicycle component manufacturers as well as for bicycle shops that carry a full line of bicycle components. In particular, two types of front derailleurs now must be manufactured. One type of front derailleur that accommodates an upwardly pulled front shift cable and another type of front derailleur that accommodates a downwardly pulled front shift cable. Accordingly, most component manufacturers produce an upwardly pulled type front derailleur and a downwardly pulled type front derailleur. In some cases, derailleurs have been produced that can be used for both upwardly and downwardly pulled front shift cable. However, the shift cables of these front derailleurs are often pulled at sharp angles from the cable attachment points. This can result in excessive stress on the inner wire of the shift cable.

In view of the above, there exists a need for a front derailleur for a bicycle, which can be used with either an upwardly pulled front shift cable or a downwardly pulled front shift cable. Moreover, there exists a need for a front derailleur that minimizes stress on the inner wire of the shift cable whether the inner wire is being pulled upwardly or downwardly. This invention addresses this need in the prior art as well as other needs, which will become apparent to those skilled in the art from this disclosure.

SUMMARY OF THE INVENTION

One object of the present invention is to provide a front derailleur for a bicycle that can be used with many different shapes of bicycle frames.

Another object of the present invention is to provide a front derailleur for a bicycle that has a detachable cable guide adapter such that the front derailleur can be used with an upwardly pulled cable or a downwardly pulled cable.

The foregoing objects can basically be attained by providing a front derailleur for a bicycle comprising a fixed member, a chain guide and a linkage assembly. The fixed member is adapted to be coupled to a portion of the bicycle. The chain guide has a chain receiving slot to shift a chain of the bicycle in a transverse direction. The linkage assembly is coupled between the fixed member and the chain guide to move the chain guide between a retracted position and an extended position. The linkage assembly includes a biasing member and a first link. The biasing member urges the chain guide to one of the retracted and extended positions. The first link is pivotally coupled relative to the fixed member. The first link has a cable attachment member coupled to the first link, and a detachable cable guide adapter removably coupled to the first link. The cable attachment member is adapted to couple a shift cable thereto. The detachable cable guide adapter has a cable receiving surface that is configured and located to guide the shift cable upwardly therefrom.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
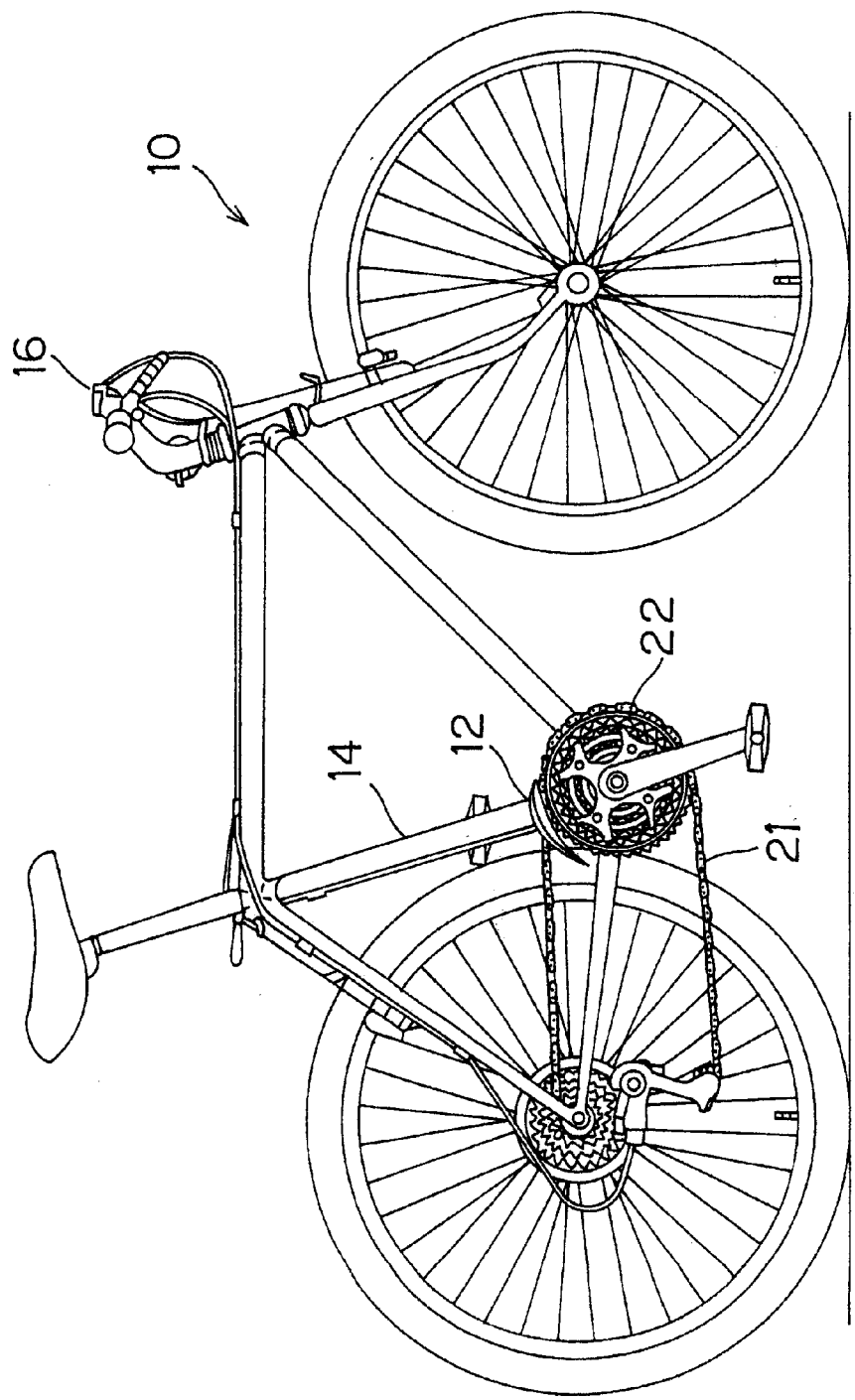
FIG. 1 is a side elevational view of a conventional bicycle with a front derailleur coupled thereto in accordance with one embodiment of the present invention.

Referring initially to FIG. 1, a bicycle 10 is illustrated with a front derailleur 12 fixedly coupled to its seat post portion 14 of its frame. The front derailleur 12 is operated by shifting unit 16 via a shift cable 18 to move chain 20 between sprockets 22.

Figure 2:
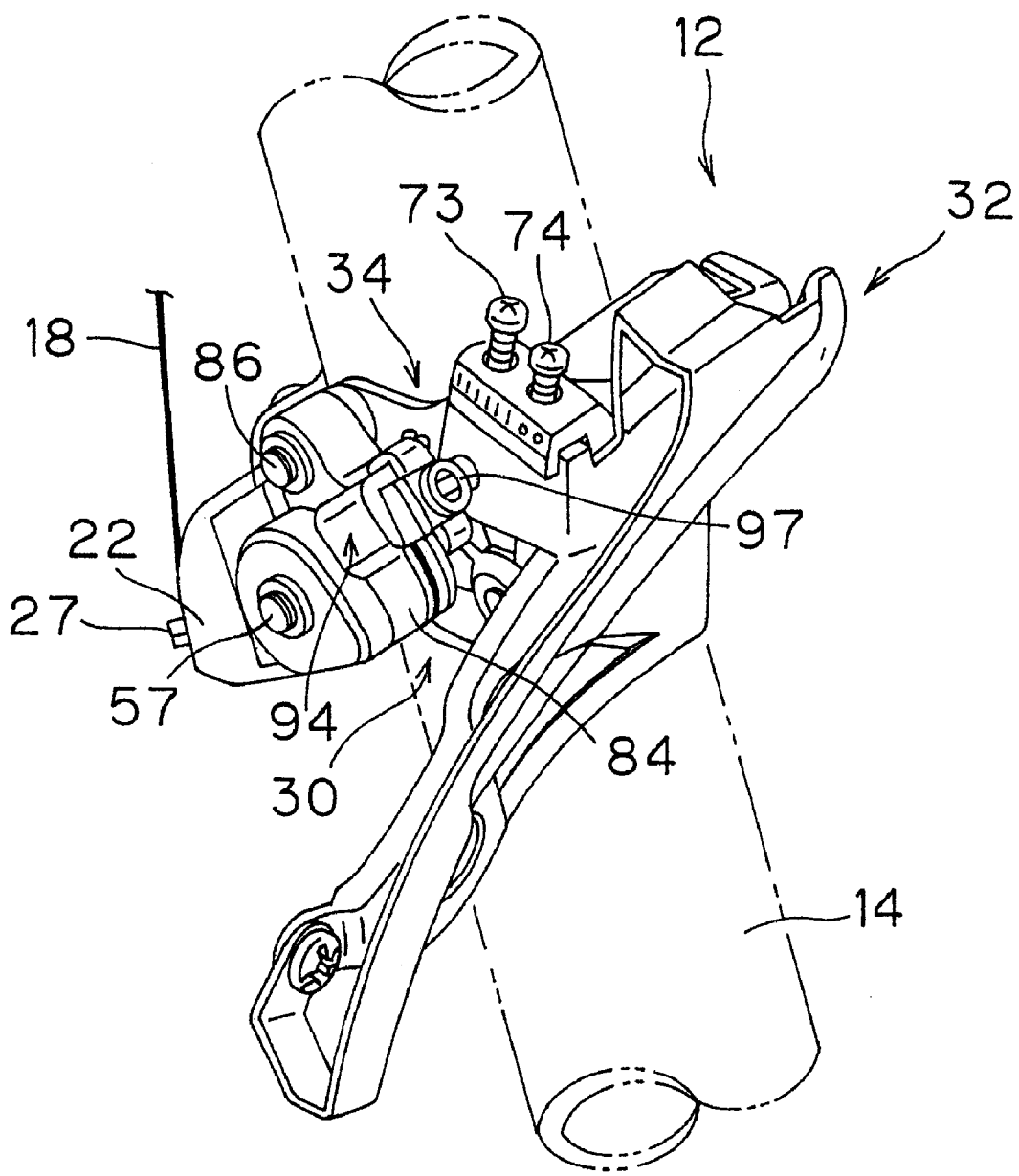
FIG. 2 is a perspective view of the front derailleur coupled to the seat post portion of the bicycle frame with a cable guide adapter attached thereto in accordance with one embodiment of the present invention.
Figure 3:
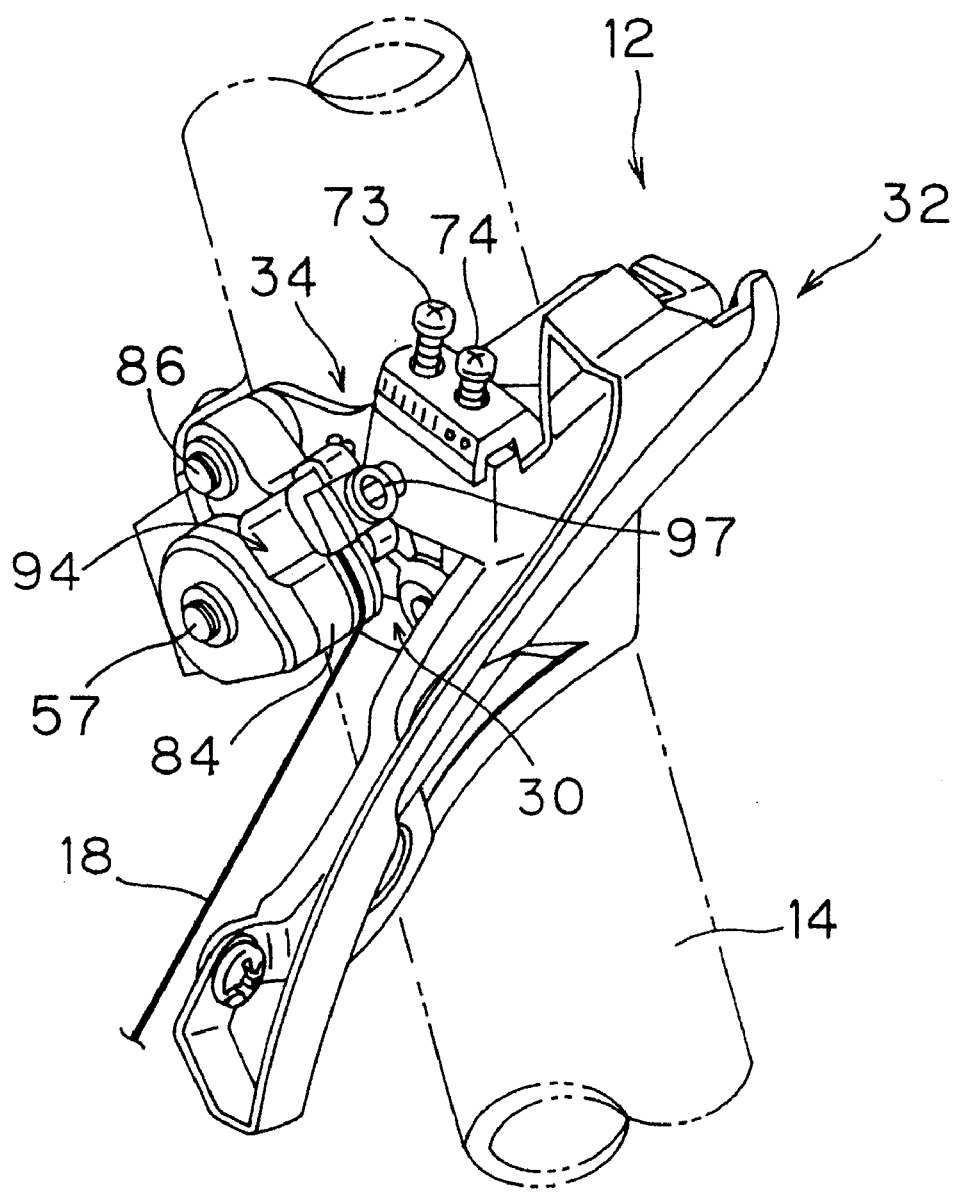
FIG. 3 is a perspective view of the front derailleur coupled to the seat post portion of the bicycle frame with the cable guide adapter removed in accordance with one embodiment of the present invention.

Front derailleur 12 has a detachable cable guide adapter 22 in accordance with the present invention, which is designed to accommodate a wide variety of bicycles. In particular, front derailleur 12 can be used with shift cable 18 coming from above the front derailleur 12 by using cable guide adapter 22 (FIG. 2), or with shift cable 18 coming from below the front derailleur 12 (FIG. 3). In other words, the cable 18 can be coupled to front derailleur 12 such that its inner wire is either pulled upwardly or downwardly from front derailleur 12 by shifting unit 16.

Bicycles and their various components are well known in the art, and thus, bicycle 10 and its various components will not be discussed or illustrated in detail herein except for the components that relate to the present invention. In other words, only front derailleur 12 and the components that relate thereto will be discussed and/or illustrated herein.

As used herein, the terms "forward, rearward, upward, above, downward, below and transverse" refer to those directions of a bicycle in its normal riding position, which front derailleur 12 is attached. Accordingly, these terms, as utilized to describe the front derailleur 12 in the claims, should be interpreted relative to bicycle in its normal riding position.

While front derailleur 12 is illustrated as being fixedly coupled to seat post portion 14 of the bicycle frame, it will be apparent to those skilled in the art from this disclosure that front derailleur 12 can be coupled to other parts of the bicycle such as the bottom bracket as needed and/or desired.

Figure 4:
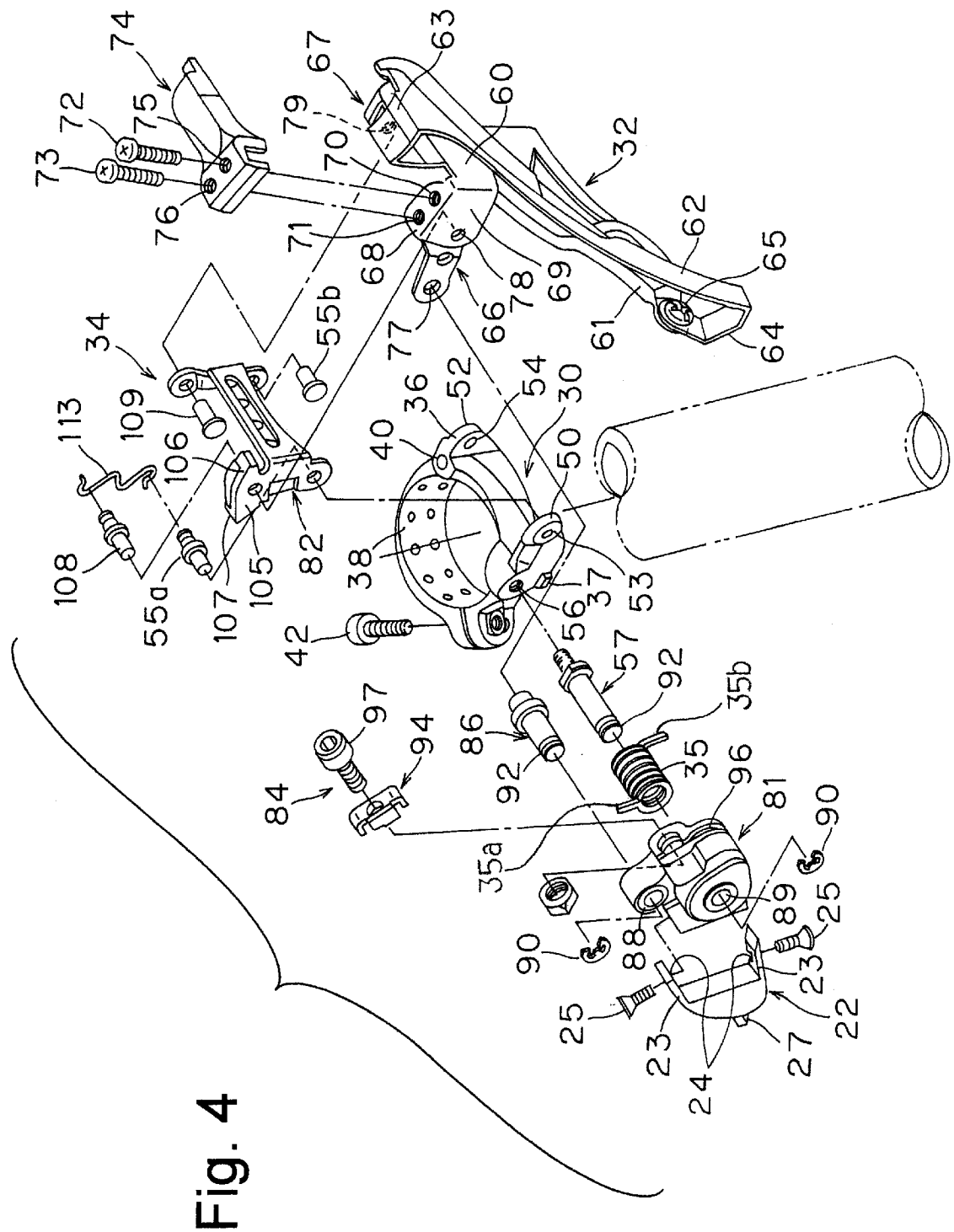
FIG. 4 is an exploded perspective view of selected parts of the front derailleur illustrated in FIG. 2 in accordance with one embodiment of the present invention.
Figure 5:
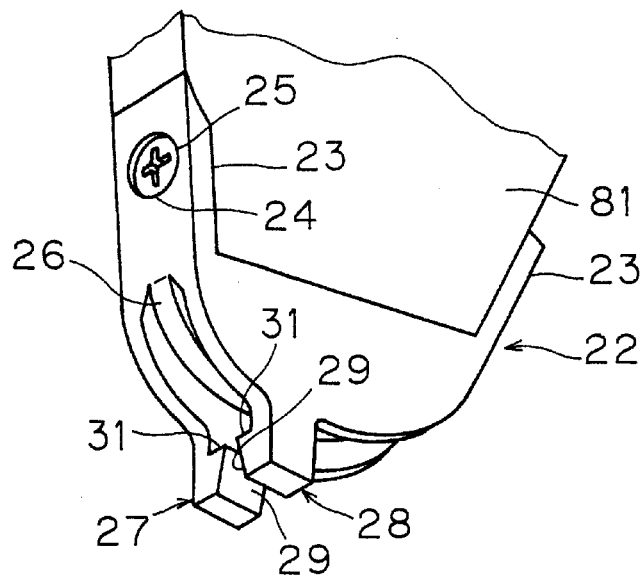
FIG. 5 is an enlarged, partial perspective view of the cable guide adapter for the front derailleur illustrated in FIGS. 2–4.

As seen in FIGS. 4 and 5, cable guide adapter 22 is preferably a C-shaped member having a pair of flanges 23 with a mounting hole 24 formed in each flange 23. Mounting holes 24 receive the threaded ends of a pair of screws or fasteners 25 therethrough for attachment to front derailleur 12. The edge of cable guide adapter 22 is provided with a retaining groove or recess 26 that receives the inner wire of shift cable 18 therein. Groove 26 is formed at a position to receive the inner wire of cable 18 extends from front derailleur 12.

Cable guide adapter 22 is utilized on front derailleur 12 when it is desirable to have the shift cable 18 located above the front derailleur 12. Accordingly, cable guide adapter 22 guides the inner wire of the shift cable 18 around the edge of cable guide adapter 22 and then upwardly to the point where cable 18 is coupled to the bicycle frame. Two resilient retainers or hooks 27 and 28 are provided adjacent to retaining groove 26 such that the inner wire of shift cable 18 does not accidentally pop out of retaining groove 26. In this embodiment, retainers 27 and 28 are substantially identical to each other, except that they are mirror images of each other.

As shown in FIG. 5, retainers 27 and 28 are formed integrally with the main body of cable guide adapter 22 as a one-piece, unitary member. Retainers 27 and 28 are located on opposite sides of groove 26. Retainers 27 and 28 each include an inwardly extending projection formed by an inwardly tapered surface 29 and an inner abutment surface 31 that are formed to overlie retaining groove 26. Retainers 27 and 28 are located opposite each other across groove 26, with both tapered surfaces 29 facing each other. Abutment surfaces 31 form a gap that is slightly smaller than the diameter of the inner wire of cable 18 to prevent cable 18 from popping out of groove 26 accidentally.

Basically, front derailleur 12 includes a fixed or tubular clamping member 30, a chain guide 32 and a linkage assembly 34 coupled between fixed member 30 and chain guide 32. As best seen in FIGS. 2–4, fixed member 30 is located beneath chain guide 32 and linkage assembly 34 such that chain guide 32 moves from a retracted (low gear) position to an extended (high gear) position. Linkage assembly 34 is preferably designed such that biasing member (torsion spring) 35 normally biases chain guide 32 in a transverse direction towards the frame of bicycle 10. In other words, when chain guide 32 is closest to the frame of bicycle 10, chain guide 32 holds chain 20 over the sprocket 22 that is closest to seat post portion 14.

When linkage assembly 34 holds chain guide 32 in its extended position, chain guide 32 is located over the outermost sprocket 22, i.e., the furthest sprocket 22 from seat post portion 14. These movements of chain guide 32 and linkage assembly 34 are controlled by shifting unit 16. Specifically, when the rider squeezes the lever of shifting unit 16, this pulls shift cable 18 to move chain guide 32 between its extended position and its retracted position via linkage assembly 34. Shifting unit 16 can be a variety of types of shifting units. Therefore, the precise structure of shifting unit 16 will not be discussed or illustrated in detail herein.

As seen in FIG. 4, fixed member 30 is preferably clamped directly to the seat post portion 14. Fixed member 30 basically includes a first C-shaped clamping portion 36, a second C-shaped clamping portion 38, a pivot pin 40 and a fastener 42. First and second clamping portions 36 and 38 are constructed of a rigid material to secure front derailleur 12 to seat post portion 14 of bicycle 10. Preferably, clamping portions 36 and 38 are constructed of metal. Of course, clamping portions 36 and 38 could be constructed of other materials such as a hard rigid plastic material. In the illustrated embodiment, the clamping portions 36 and 38 are constructed by utilizing other manufacturing techniques such as casting and/or machining. Of course, clamping portions 36 and 38 can also be constructed of sheet metal that is bent to the desired shape.

First ends of clamping portions 36 and 38 are pivotally coupled together by pivot pin 40, which extends in a substantially vertical direction relative to bicycle 10. The other ends of clamping portions 36 and 38 are releasably connected together via fastener 42. Fastener 42 is preferably a screw or bolt that is threaded into a threaded hole of first clamping portion 36. Of course, fastener 42 can be utilized in conjunction with a nut, or the like.

As best seen in FIG. 4, first clamping portion 36 includes portions of linkage assembly 34. In other words, portions of linkage assembly 34 are integrally formed with first clamping portion 36, as explained below.

The clamping portion 36 has a pair of substantially parallel mounting flanges 50 and 52 that extend in substantially vertical directions. Mounting flanges 50 and 52 each have a pivot hole 53 and 54 that receives pivot pins 55a and 55b for mounting a portion of linkage assembly 34 thereto, as explained below. Mounting flange 50 also has a second pivot hole 56 for receiving pivot pin 57 therein to couple another portion of linkage assembly 34 thereto. As explained below in more detail, flange 50 forms one of the links (third link) of linkage assembly 34. Accordingly, flange 50 is a nonmovable link.

As best seen in FIG. 4, chain guide 32 is preferably constructed of a hard rigid material. For example, chain guide 32 is preferably constructed of metal such as a rigid sheet metal that is bent to the desired shape. Chain guide 32 has a chain receiving slot 60 formed by a pair of vertical shift plates 61 and 62 that are adapted to engage chain 20 for moving chain 20 in a direction transverse to bicycle 10. Shift plates 61 and 62 are connected together by plates 63 and 64. Plate 63 is integrally formed between shift plates 61 and 62. Plate 64 has one end that is integrally formed with shift plate 62 and another end that is detachably coupled to shift plate 61 via screw 65.

Chain guide 32 also has a pair of mounting flanges 66 and 67 extending in a substantially vertical direction from shift plate 61 for coupling linkage assembly 34 thereto. Mounting flange 66 forms one of the links of linkage assembly 34. More specifically, mounting flange 66 has a substantially horizontal section 68 and a substantially vertical section 69. Vertical section 69 has a stepped surface. Horizontal section 68 has a pair of threaded holes 70 and 71 for receiving adjustment screws 72 and 73 thereto. Adjustment screw 72 is a low position adjustment screw, while adjustment screw 73 is a high position adjustment screw. Adjustment screws 72 and 73 engage a portion of linkage assembly 34 as discussed below for controlling the range of movement of chain guide 32. In other words, by individually adjusting the axial extension of adjustment screws 72 and 73 relative to horizontal section 68, the retracted (low gear) position and the extended (high gear) position of chain guide 32 are adjusted independently of each other.

A top cover 74 is provided to overlie mounting flanges 66 and 67. Top cover 74 is preferably a non-metallic or plastic member that has a pair of bores 75 and 76. The bores 75 and 76 are initially formed with diameters that are slightly smaller than the thread diameters of adjustment screws 72 and 73. Accordingly, when adjustment screws 72 and 73 are threaded through bores 75 and 76, the non-metallic material is cut or tapped to form internal threads. This creates a friction fit between top cover 74 and adjustment screws 72 and 73. Accordingly, adjustment screws 72 and 73 will typically not move in an axial direction due to vibrations because of this frictional force between top cover 74 and adjustment screws 72 and 73, unless the screws 72 and 73 are manually adjusted by a person.

Vertical section 69 of mounting flange 66 forms one of the links of the linkage assembly 34. Mounting flange 66 has a pair of pivot holes 77 and 78 for pivotally mounting a pair of links of linkage assembly 34 thereto, as discussed below. Mounting flange 67 has a pivot hole 79 that is aligned with pivot hole 78 of vertical section 69 for pivotally coupling a link of linkage assembly 34 therebetween.

Linkage assembly 34 is preferably a four-bar linkage assembly having a first link 81, a second link (vertical section) 69, a third link (mounting flange) 50 and a fourth link 82. First link 81 has its pivot points lying on a line which is substantially parallel to a line that passes through the pivot points of fourth link 82. Similarly, second link (vertical section) 69 has its pivot points lying on a line which is substantially parallel to a line passing through the pivot points of third link (mounting flange) 50.

First link 81 has a cable attachment member 84 coupled thereto and cable guide adapter 22 detachably coupled thereto. First link 81 is pivotally coupled at one end to second link or vertical section 69 by pivot pin 86. The other end of first link 81 is pivotally coupled to third link or flange 50 of fixed member 30 via pivot pin 57. Accordingly, first link 81 has pivot holes 88 and 89 for receiving pivot pins 86 and 57 therein. First link 81 is preferably secured on pivot pins 86 and 57 by snap-on retaining washers 90. More specifically, pivot pins 86 and 57 each have a groove 92 for receiving retaining washers 90. Preferably, these retaining washers 90 are E-shaped retaining clips that are snapped into retaining grooves 92.

Cable attachment member 84 has a wire clamp 94 for attaching the inner wire of cable 18 thereto. First link 81 also has a groove 96 adjacent to wire clamp 94, such that the inner wire of cable 18 extends from wire clamp 94 along groove 96. Preferably, wire clamp 94 is coupled to first link 81 via bolt 97.

Fourth link 82 is pivotally mounted to second link or vertical section 69 of chain guide 32 via pivot pins 108 and 109. Specifically, pivot pins 108 and 109 are received in pivot holes 78 and 79 of flanges 66 and 67. The other end of fourth link 82 is pivotally mounted via pivot pins 55a and 55b on mounting flanges 50 and 52. Pivot pins 55a and 108 are snapped into a retaining clip 113.

Figure 6:
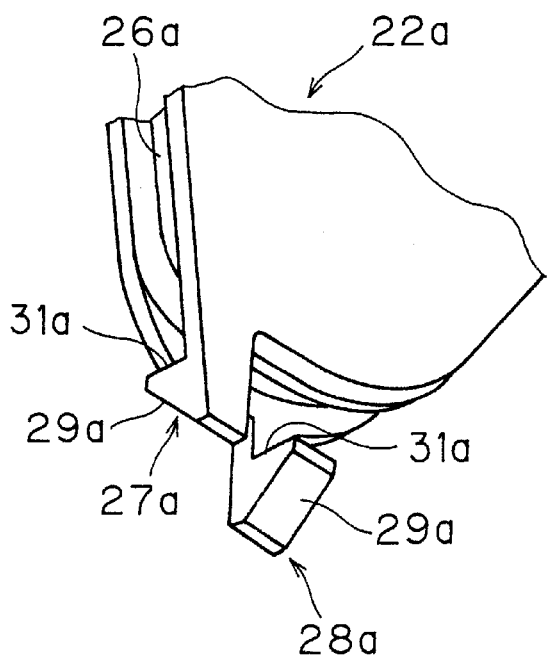
FIG. 6 is an enlarged, partial perspective view of an alternate embodiment of the cable guide adapter for the front derailleur illustrated in FIGS. 2–4.

The upper end of fourth link 82 is provided with a fan-shaped member 105 that engages adjustment screws 72 and 73 for limiting movement of chain guide 32 between its retracted position and its extended position. More specifically, fan member 105 is provided with a low stopping surface 106 and a high stopping surface 107 as best seen in FIGS. 5 and 6. Low stopping surface 106 is designed to engage the free end of low adjustment screw 72, while high stopping surface 107 is positioned to engage the high adjustment screw 73. Since this is a relatively conventional adjustment mechanism that is well known in the prior art, this adjustment mechanism will not be discussed or illustrated in detail herein.

Biasing member 35 is preferably a torsion spring having its coiled portion positioned around pivot pin 57 therein. Biasing member 35 has a first end engaging a projection (not shown) on first link 81, and a second end engaging a projection 37 on mounting flange 50 of fixed member 30 for normally biasing chain guide 32 from its extended position to its retracted position. In other words, biasing member or torsion spring 35 is normally placed under tension to urge the cable guide 32 from its extended position to its retracted position. Of course, movement of chain guide 32 is controlled by shifting unit 16 moving cable 18 in a relatively conventional manner.

Preferably, pivot pin 57 is riveted in hole 56 of second link or flange 50, and has cable attachment member detachably coupled to the other end via one of the retaining washers 90.

Second Embodiment

Referring now to FIG. 6, a cable guide adapter 22a in accordance with a second embodiment of the present invention is illustrated. This embodiment of cable guide adapter 22a is similar to cable guide adapter 22 of the prior embodiment, discussed above, except that the retainers 27a and 28a of this embodiment have been modified. In this second embodiment, retainers 27a and 28a are longitudinally spaced apart from each other along groove 26a to form a gap therebetween. Retainers 27a and 28a each have inwardly extending projections formed by a tapered surface 29a and an abutment surface 31a. Abutment surfaces 31a are formed to overlie groove 26a in opposite directions to prevent cable 18 from popping out of groove 26a accidentally.

In view of the similarities between this embodiment and the prior embodiment, identical reference numerals will be utilized to refer to the parts of this embodiment that correspond to the first embodiment. Moreover, it will be apparent to those skilled in the art from this disclosure that the various parts and descriptions of the prior embodiments apply to the similar identical parts of this embodiment. Thus, the front derailleur 12 of this embodiment will not be discussed or illustrated in as much detail. Rather, it will be apparent to those skilled in the art from this disclosure that the various parts and descriptions of the prior embodiments apply to the similar or identical parts of this embodiment.

Third Embodiment

Figure 7:
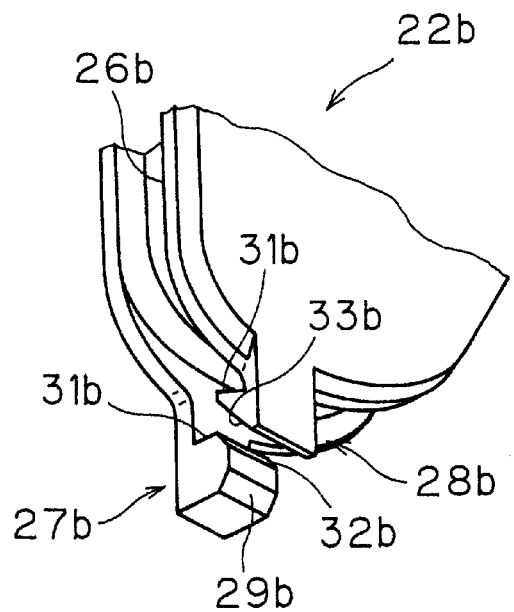
FIG. 7 is a partial elevational view of an alternate embodiment of the cable guide adapter for the front derailleur illustrated in FIGS. 2–4.

Referring now to FIG. 7, a cable guide adapter 22b in accordance with a third embodiment of the present invention is illustrated. This embodiment of cable guide adapter 22b is similar to cable guide adapter 22 of the prior embodiment, discussed above, except that the retainers 27b and 28b of this embodiment have been modified. In this embodiment, retainers 27b have an inwardly extending projection having a tapered surface 29b, abutment surface 31b, and an inner surface 32b, which tapers away from retainer 28b as inner surface 32b approaches groove 26b. Retainer 28b has an inwardly extending projection having an outer surface 33b, which tapers from its free end toward retainer 27b as outer surface 33b approaches groove 26b. Inner surface 32b and outer surface 33b are substantially parallel. In order that cable 18 be inserted into or removed from groove 26b. Cable 18 has to be moved in a direction parallel to inner and outer surfaces 32b and 33b. The purpose of the retainers is still the same, that is, for preventing cable 18 from popping out of groove 26b accidentally.

In view of the similarities between this embodiment and the prior embodiment, identical reference numerals will be utilized to refer to the parts of this embodiment that correspond to the first embodiment. Moreover, it will be apparent to those skilled in the art from this disclosure that the various parts and descriptions of the prior embodiments apply to the similar identical parts of this embodiment. Thus, this embodiment of the front derailleur will not be discussed or illustrated in as much detail. Rather, it will be apparent to those skilled in the art from this disclosure that the various parts and descriptions of the prior embodiments apply to the similar or identical parts of this embodiment.

Fourth Embodiment

Figure 8:
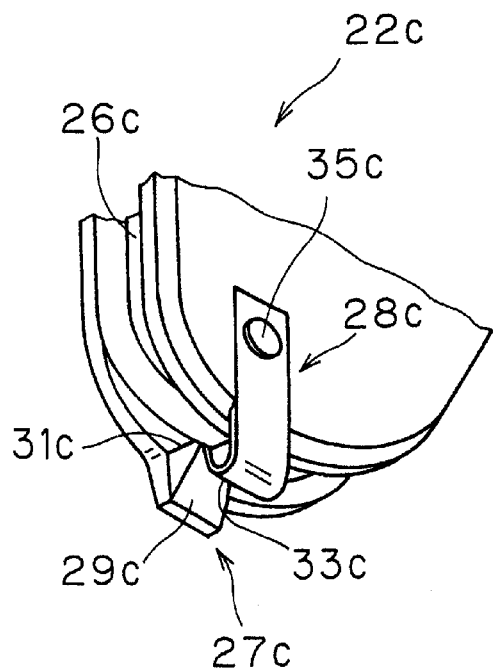
FIG. 8 is a partial elevational view of an alternate embodiment of the cable guide adapter for the front derailleur illustrated in FIGS. 2–4.

Referring now to FIG. 8, a cable guide adapter 22c in accordance with a fourth embodiment of the present invention is illustrated. This embodiment of cable guide adapter 22c is similar to cable guide adapters in prior embodiments, discussed above, except that the retainers 27c and 28c of this embodiment have been modified. In this embodiment, retainer 27c is formed integrally with cable guide adapter 22c as a one-piece, unitary member, whereas retainer 28c is a resilient member with one end fixedly coupled to cable guide adapter 22c by a fastener 35c. Retainer 27c has an inwardly extending projection formed by a tapered surface 29c and abutment surface 31c. Retainer 28c is preferably a sheet metal member having an inwardly extending projection formed by a bent surface 33c. Abutment surface 31c and the free end of bent surface 33c form a gap that is smaller than the diameter of the inner wire of cable 18 to prevent cable 18 from popping out of groove 26c accidentally.

In view of the similarities between this embodiment and the prior embodiment, identical reference numerals will be utilized to refer to the parts of this embodiment that correspond to the first embodiment. Moreover, it will be apparent to those skilled in the art from this disclosure that the various parts and descriptions of the prior embodiments apply to the similar identical parts of this embodiment. Thus, this embodiment of the front derailleur will not be discussed or illustrated in as much detail. Rather, it will be apparent to those skilled in the art from this disclosure that the various parts and descriptions of the prior embodiments apply to the similar or identical parts of this embodiment.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A front derailleur for a bicycle, comprising:
   a fixed member adapted to be coupled to a portion of the bicycle;
   a chain guide having a chain receiving slot to shift a chain of the bicycle in a transverse direction; and
   a linkage assembly coupled between said fixed member and said chain guide to move said chain guide between a retracted position and an extended position, said linkage assembly including
   a biasing member urging said chain guide to one of said retracted and extended positions, and
   a first link pivotally coupled relative to said fixed member, said first link having a cable attachment member coupled thereto for coupling to a shift cable thereto and a detachable cable guide adapter removably coupled to said first link, said detachable cable guide adapter having a cable receiving surface that is configured and located to guide the shift cable upwardly therefrom.

2. A front derailleur for a bicycle according to claim 1, wherein
   said cable receiving surface includes a groove to guide the shift cable therethrough.

3. A front derailleur for a bicycle according to claim 2, wherein
   said cable guide adapter includes a retainer for retaining the shift cable on said cable receiving surface of said cable guide adapter.

4. A front derailleur for a bicycle according to claim 3, wherein
   said retainer is formed to at least partially overlie said groove.

5. A front derailleur for a bicycle according to claim 4, wherein said retainer includes first and second projections.

6. A front derailleur for a bicycle according to claim 5, wherein
said first and second projections are located on opposite sides of said groove.

7. A front derailleur for a bicycle according to claim 6, wherein
said first and second projections are longitudinally spaced apart from each other along said groove to form a gap therebetween.

8. A front derailleur for a bicycle according to claim 6, wherein
said first projection includes an inner surface tapering away from said second projection as said inner surface approaches said groove, and
said second projection includes an outer surface tapering from its free end toward said first projection as said outer surface approaches said groove, said inner and outer surfaces being substantially parallel.

9. A front derailleur for a bicycle according to claim 5, wherein
said first and second projections are formed integrally with said cable guide adapter as a one-piece, unitary part of said cable guide adapter.

10. A front derailleur for a bicycle according to claim 5, wherein
said first and second projections are formed opposite each other.

11. A front derailleur for a bicycle according to claim 5, wherein
said first projection is formed integrally with said cable guide adapter as a one-piece, unitary part of said cable guide adapter, and
said second projection is a resilient member with one end fixedly coupled to said cable guide adapter by a fastening element.

12. A front derailleur for a bicycle according to claim 1, wherein
said cable guide adapter includes a retainer for retaining the shift cable on said cable receiving surface of said cable guide adapter.

13. A front derailleur for a bicycle according to claim 1, wherein
said cable guide adapter includes mounting means for detachably coupling a able guide adapter thereto.

14. A front derailleur for a bicycle according to claim 13, wherein
said mounting means includes at least one fastener which removably fastens said cable guide adapter on said first link.

15. A front derailleur for a bicycle according to claim 1, wherein
said chain guide is located above said fixed member when mounted on the bicycle.

16. A front derailleur for a bicycle according to claim 1, wherein
said biasing member is a torsion spring that engages said first link.

17. A front derailleur for a bicycle according to claim 1, wherein
said linkage assembly forms a four bar linkage with a second link formed by said chain guide, a third link formed by said fixed member and a fourth link pivotally coupled between said second and third links.

18. A front derailleur for a bicycle according to claim 1, wherein
said linkage assembly further includes a second link rigidly coupled to said chain guide to move therewith.

19. A front derailleur for a bicycle according to claim 18, wherein
said first link is pivotally coupled to a third link formed by said fixed member by a first pivot pin and pivotally coupled to said second link of said chain guide, and
said biasing member has a first end engaging said first link and a second end engaging said fixed member.

20. A front derailleur for a bicycle according to claim 19, wherein
said linkage assembly includes a fourth link pivotally coupled to said second link at a first end and pivotally coupled to said third link of said fixed member at a second end.

* * * * *